United States Patent
Chen

(10) Patent No.: US 10,280,345 B2
(45) Date of Patent: May 7, 2019

(54) TWO-PART STRUCTURAL ADHESIVE

(71) Applicant: 3M INNOVATIVE PROPERTIES COMPANY, St. Paul, MN (US)

(72) Inventor: Lianzhou Chen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/550,965

(22) PCT Filed: Feb. 17, 2016

(86) PCT No.: PCT/US2016/018195
§ 371 (c)(1),
(2) Date: Aug. 14, 2017

(87) PCT Pub. No.: WO2016/137791
PCT Pub. Date: Sep. 1, 2016

(65) Prior Publication Data
US 2018/0030319 A1 Feb. 1, 2018

Related U.S. Application Data

(60) Provisional application No. 62/126,004, filed on Feb. 27, 2015.

(51) Int. Cl.
C08G 59/50 (2006.01)
C08G 59/32 (2006.01)
C09J 163/00 (2006.01)
C08G 59/18 (2006.01)

(52) U.S. Cl.
CPC .......... *C09J 163/00* (2013.01); *C08G 59/184* (2013.01); *C08G 59/5026* (2013.01); *C08G 59/3218* (2013.01); *C08G 59/3227* (2013.01); *C08G 59/5093* (2013.01)

(58) Field of Classification Search
None
See application file for complete search history.

(56) References Cited

U.S. PATENT DOCUMENTS 7,223,820 B2 5/2007 Fischer

FOREIGN PATENT DOCUMENTS

| EP | 0 488 949 | 6/1992 |
|---|---|---|
| EP | 0 722 965 | 7/1996 |
| GB | 1002454 | 8/1965 |
| JP | 4-308893 | 10/1992 |
| JP | 11-21335 | 1/1999 |
| JP | 2000-273151 | 10/2000 |
| JP | 2001-163954 | 6/2001 |
| JP | 2001163954 A * | 6/2001 |
| WO | WO 1996/034032 | 10/1996 |
| WO | WO 1999/028365 | 6/1999 |
| WO | WO 2004/104130 | 12/2004 |
| WO | WO 2010/005710 | 1/2010 |
| WO | WO 2014/035655 | 3/2014 |
| WO | WO 2014/062895 | 4/2014 |

OTHER PUBLICATIONS

Momentive Specialty Chemicals Inc., "EPON and EPI-REZ Epoxy Resins", Aug. 2013. (Year: 2013).*
International Search Report for PCT/US2016/018195, dated Apr. 26, 2016, 5 pages.
Epikote™ Resin 828, Product data sheet, Re-issued Oct. 2004.

* cited by examiner

Primary Examiner — Richard A Huhn
(74) Attorney, Agent, or Firm — Philip P. Soo

(57) ABSTRACT

A two-part adhesive is provided comprising: A) a curative part comprising: i) one or more epoxy curatives, where the one or more epoxy curatives include norbornane diamine (NBDA); and ii) a reaction intermediate which is the reaction product of a liquid epoxy resin having an epoxy functionality of 2 with an excess of the epoxy curatives; and B) an epoxy part comprising: iii) one or more multifunctional epoxy resins having an epoxy functionality of greater than 2.2; in some embodiments epoxy functionality of greater than 2.6; in some embodiments epoxy functionality of 3 or greater; and in some embodiments epoxy functionality of 4 or greater. In some embodiments the one or more epoxy curatives additionally include 4,7,10 Trioxa-1,13-tridecane-diamine (TDD). In some embodiments the one or more multifunctional epoxy resins include tetraglycidyl methylenedianiline (TGMDA).

20 Claims, No Drawings

TWO-PART STRUCTURAL ADHESIVE

CROSS REFERENCE TO RELATED APPLICATIONS

This application is a national stage filing under 35 U.S.C. 371 of PCT/US2016/018195, filed Feb. 17, 2016, which claims the benefit of U.S. Provisional Patent Application No. 62/126,004, filed Feb. 27, 2015, the disclosures of which are incorporated by reference in their entirety herein.

FIELD OF THE DISCLOSURE

This disclosure relates to a two-part structural epoxy adhesive which typically exhibits fast room temperature cure and cures to a bond with excellent high temperature properties.

BACKGROUND OF THE DISCLOSURE

The following references may be relevant to the technology of the present disclosure: WO 2014/062895 A1, JP 2001-163954, U.S. Pat. No. 7,223,820, JP 4308893, JP 11021335, GB 1,002,454.

SUMMARY OF THE DISCLOSURE

Briefly, the present disclosure provides a two-part adhesive comprising: A) a curative part comprising: i) one or more epoxy curatives, where the one or more epoxy curatives include norbornane diamine (NBDA); and ii) a reaction intermediate which is the reaction product of a liquid epoxy resin having an epoxy functionality of 2 with an excess of the epoxy curatives; and B) an epoxy part comprising: iii) one or more multifunctional epoxy resins having an epoxy functionality of greater than 2.2; in some embodiments epoxy functionality of greater than 2.6; in some embodiments epoxy functionality of 3 or greater; and in some embodiments epoxy functionality of 4 or greater. In some embodiments the curative part comprises more than 11.0 wt % NBDA. In some embodiments the one or more epoxy curatives additionally include 4,7,10-Trioxa-1,13-tridecane-diamine (TDD); in some embodiments more than 6.0 wt % TDD. In some embodiments the epoxy part comprises more than 21.0 wt % of the multifunctional epoxy resins having an epoxy functionality of greater than 2.5. In some embodiments, the epoxy part comprises more than 21.0 wt % of multifunctional epoxy resins having an epoxy functionality of 4. In some embodiments the one or more multifunctional epoxy resins include tetraglycidyl methylenedianiline (TGMDA); in some embodiments the epoxy part comprises more than 21.0 wt % TGMDA. In some embodiments the epoxy part comprises more than 21.0 wt % of triglycidyl ether of trisphenol-methane. In some embodiments the the curative part additionally comprises core/shell rubber nanoparticles; in some embodiments greater than 4.1 wt % core/shell rubber nanoparticles. In some embodiments the curative part additionally comprises a reaction intermediate which is the reaction product of a suspension of core/shell rubber nanoparticles in a liquid epoxy resin and an excess of the one or more epoxy curatives. In some embodiments the epoxy part comprises greater than 9.1 wt % core/shell rubber nanoparticles. In some embodiments the epoxy part additionally comprises greater than 11.0 wt % solid epoxy resin. Additional embodiments of the two-part adhesive of the present disclosure are described below under "Selected Embodiments."

In another aspect, the present disclosure provides a cured material that results from mixing the curative part with the epoxy part of any of the two-part adhesives according to the present disclosure and allowing cure. Additional embodiments of the cured material of the present disclosure are described below under "Selected Embodiments."

In this application:

"epoxy curative" means a compound, oligomer or polymer capable of reacting with an epoxy resin to form cross-links, "epoxy resin" means a compound, oligomer or polymer having reactive epoxide functional groups;

"epoxy equivalent weight" of an epoxy resin means the weight of resin per epoxide functional group;

"functionality" of an epoxy resin means the number of epoxide functional groups per molecule (where non-integer values represent an average for the epoxy resin);

"liquid epoxy resin" means an epoxy resin which in its uncured state is a liquid under standard temperature and pressure; and "solid epoxy resin" means an epoxy resin which in its uncured state is a solid under standard temperature and pressure.

DETAILED DESCRIPTION

The present disclosure provides a two-part structural epoxy adhesive demonstrating fast room temperature cure which cures to a bond with excellent high temperature properties. The two-part adhesive includes a curative part which includes norbornane diamine (NBDA) curative, and, in many embodiments 4,7,10-Trioxa-1,13-tridecane-diamine (TTD) curative, and an epoxy part which includes multifunctional epoxy resins having an epoxy functionality of greater than 2.2, in many embodiments an epoxy functionality of 3, and in many embodiments an epoxy functionality of 4.

Any suitable epoxy resins may be used in the adhesive of this disclosure, including liquid and solid epoxy resins. Typically liquid epoxy resins are used. Any suitable liquid epoxy resins may be used in the adhesive of this disclosure. Suitable liquid epoxy resins may include diglycidyl ethers of bisphenol F, low epoxy equivalent weight diglycidyl ethers of bisphenol A, liquid epoxy novolacs, liquid aliphatic epoxies, and liquid cycloaliphatic epoxies such as, e.g., 1,4-cyclohexandimethanoldiglycidylether. Suitable liquid epoxy resins may include epoxy-functional species used as, or known as, reactive diluents. In some embodiments, solid epoxy resins may be used in the adhesive of this disclosure. Suitable solid epoxy resins may include high epoxy equivalent weight diglycidyl ethers of bisphenol A, solid epoxy novolacs, and triglycidyl ether of trisphenol-methane.

Any suitable multifunctional epoxy resins may be used in the adhesive of this disclosure. Suitable multifunctional epoxy resins may include tetraglycidyl methylenedianiline (TGMDA), tris-(hydroxyl phenyl)-methane.

In addition to NBDA, any suitable epoxy curatives may be used in the adhesive of this disclosure. In some embodiments, 4,7,10-Trioxa-1,13-tridecane-diamine (TTD) curative is also used. Suitable additional epoxy curatives may include amines, diamines, polyamines, polyamides, amidoamines, anhydrides, dicyandiamides, substituted ureas, thiols, phenolic curatives such as, e.g., diallyl bisphenol A and the like.

In some embodiments, core/shell rubber nanoparticles may be added to the epoxy part, the curative part, or both. Any suitable core/shell rubber nanoparticles may be used in the adhesive of this disclosure. In some embodiments, the core/shell rubber nanoparticles are added neat to the curative or epoxy parts of the present adhesive. In some embodiments, the core/shell rubber nanoparticles are introduced as a suspension of core/shell rubber nanoparticles in a liquid component of the curative or epoxy parts. Typically, in adding the core/shell rubber nanoparticles to the curative part, the suspension of core/shell rubber nanoparticles is first reacted with an excess of epoxy curative to form a reaction intermediate which is then used in the curative part. Typically, the core/shell rubber nanoparticles are introduced to the epoxy part as a suspension of core/shell rubber nanoparticles in a liquid epoxy. Suitable core/shell rubber nanoparticles may include cores of polybutadiene, butadiene/styrene copolymers, siloxanes, or the like, within a harder polymeric shell. In some embodiments, have an average diameter of 1-500 nm.

Selected Embodiments

The following embodiments, designated by letter and number, are intended to further illustrate the present disclosure but should not be construed to unduly limit this disclosure.

A1. A two-part adhesive comprising:
  A) a curative part comprising:
    i) one or more epoxy curatives, where the one or more epoxy curatives include norbornane diamine (NBDA); and
    ii) a reaction intermediate which is the reaction product of a liquid epoxy resin having an epoxy functionality of 2 with an excess of the epoxy curatives;
  and
  B) an epoxy part comprising:
    iii) one or more multifunctional epoxy resins having an epoxy functionality of greater than 2.2.

A2. The two-part adhesive according to embodiment A1, wherein the one or more multifunctional epoxy resins include a multifunctional epoxy resin with epoxy functionality of greater than 2.6.

A3. The two-part adhesive according to embodiment A1, wherein the one or more multifunctional epoxy resins include a multifunctional epoxy resin with epoxy functionality of 3 or greater.

A4. The two-part adhesive according to embodiment A1, wherein the one or more multifunctional epoxy resins include a multifunctional epoxy resin with epoxy functionality of 3.

A5. The two-part adhesive according to embodiment A1, wherein the one or more multifunctional epoxy resins include a multifunctional epoxy resin with epoxy functionality of greater than 3.6.

A6. The two-part adhesive according to embodiment A1, wherein the one or more multifunctional epoxy resins include a multifunctional epoxy resin with epoxy functionality of 4 or greater.

A7. The two-part adhesive according to embodiment A1, wherein the one or more multifunctional epoxy resins include a multifunctional epoxy resin with epoxy functionality of 4.

A8. The two-part adhesive according to any of embodiments A1-A7, wherein the curative part comprises more than 11.0 wt % NBDA.

A9. The two-part adhesive according to any of embodiments A1-A7, wherein the curative part comprises more than 21.0 wt % NBDA.

A10. The two-part adhesive according to any of embodiments A1-A7, wherein the curative part comprises more than 26.0 wt % NBDA.

A11. The two-part adhesive according to any of embodiments A1-A7, wherein the curative part comprises more than 31.0 wt % NBDA.

A12. The two-part adhesive according to any of embodiments A1-A11, wherein the curative part comprises less than 69.0 wt % NBDA.

A13. The two-part adhesive according to any of embodiments A1-A11, wherein the curative part comprises less than 59.0 wt % NBDA.

A14. The two-part adhesive according to any of embodiments A1-A13, wherein the one or more epoxy curatives additionally include 4,7,10-Trioxa-1,13-tridecane-diamine (TDD).

A15. The two-part adhesive according to embodiment A14, wherein the curative part comprises more than 6.0 wt % TDD.

A16. The two-part adhesive according to embodiment A14, wherein the curative part comprises more than 9.0 wt % TDD.

A17. The two-part adhesive according to embodiment A14, wherein the curative part comprises more than 11.0 wt % TDD.

A18. The two-part adhesive according to embodiment A14, wherein the curative part comprises more than 14.0 wt % TDD.

A19. The two-part adhesive according to of embodiments A14-A18, wherein the curative part comprises less than 34.0 wt % TDD.

A20. The two-part adhesive according to any of embodiments A14-A18, wherein the curative part comprises less than 29.0 wt % TDD.

A21. The two-part adhesive according to any of embodiments A14-A18, wherein the curative part comprises less than 24.8 wt % TDD.

A22. The two-part adhesive according to any of embodiments A1-A21, wherein the epoxy part comprises more than 21.0 wt % of the multifunctional epoxy resins having an epoxy functionality of greater than 2.5.

A23. The two-part adhesive according to any of embodiments A1-A21, wherein the epoxy part comprises more than 26.0 wt % of the multifunctional epoxy resins having an epoxy functionality of greater than 2.5.

A24. The two-part adhesive according to any of embodiments A1-A21, wherein the epoxy part comprises more than 31.0 wt % of the multifunctional epoxy resins having an epoxy functionality of greater than 2.5.

A25. The two-part adhesive according to any of embodiments A1-A21, wherein the epoxy part comprises more than 36.0 wt % of the multifunctional epoxy resins having an epoxy functionality of greater than 2.5.

A26. The two-part adhesive according to any of embodiments A1-A25, wherein the epoxy part comprises less than 64.0 wt % of the multifunctional epoxy resins having an epoxy functionality of greater than 2.5.

A27. The two-part adhesive according to any of embodiments A1-A25, wherein the epoxy part comprises less than 54.0 wt % of the multifunctional epoxy resins having an epoxy functionality of greater than 2.5.

A28. The two-part adhesive according to any of embodiments A1-A27, wherein the epoxy part comprises more than 21.0 wt % of multifunctional epoxy resins having an epoxy functionality of 3.

A29. The two-part adhesive according to any of embodiments A1-A27, wherein the epoxy part comprises more than 31.0 wt % of multifunctional epoxy resins having an epoxy functionality of 3.
A30. The two-part adhesive according to any of embodiments A1-A27, wherein the epoxy part comprises more than 21.0 wt % of multifunctional epoxy resins having an epoxy functionality of 4.
A31. The two-part adhesive according to any of embodiments A1-A27, wherein the epoxy part comprises more than 26.0 wt % of multifunctional epoxy resins having an epoxy functionality of 4.
A32. The two-part adhesive according to any of embodiments A1-A27, wherein the epoxy part comprises more than 31.0 wt % of multifunctional epoxy resins having an epoxy functionality of 4.
A33. The two-part adhesive according to any of embodiments A1-A27, wherein the epoxy part comprises more than 36.0 wt % of multifunctional epoxy resins having an epoxy functionality of 4.
A34. The two-part adhesive according to any of embodiments A1-A33, wherein the one or more multifunctional epoxy resins include tetraglycidyl methylenedianiline (TGMDA).
A35. The two-part adhesive according to any of embodiments A1-A27, wherein the epoxy part comprises more than 21.0 wt % of tetraglycidyl methylenedianiline (TGMDA).
A36. The two-part adhesive according to any of embodiments A1-A27, wherein the epoxy part comprises more than 26.0 wt % of tetraglycidyl methylenedianiline (TGMDA).
A37. The two-part adhesive according to any of embodiments A1-A27, wherein the epoxy part comprises more than 31.0 wt % of tetraglycidyl methylenedianiline (TGMDA).
A38. The two-part adhesive according to any of embodiments A1-A27, wherein the epoxy part comprises more than 36.0 wt % of tetraglycidyl methylenedianiline (TGMDA).
A39. The two-part adhesive according to any of embodiments A1-A33, wherein the one or more multifunctional epoxy resins include triglycidyl ether of trisphenol-methane.
A40. The two-part adhesive according to any of embodiments A1-A27, wherein the epoxy part comprises more than 21.0 wt % of triglycidyl ether of trisphenol-methane.
A41. The two-part adhesive according to any of embodiments A1-A27, wherein the epoxy part comprises more than 31.0 wt % of triglycidyl ether of trisphenol-methane.
B1. The two-part adhesive according to any of embodiments A1-A41, wherein the curative part additionally comprises core/shell rubber nanoparticles.
B2. The two-part adhesive according to embodiment B1, wherein said curative part comprises greater than 2.1 wt % core/shell rubber nanoparticles.
B3. The two-part adhesive according to embodiment B1, wherein said curative part comprises greater than 3.1 wt % core/shell rubber nanoparticles.
B4. The two-part adhesive according to embodiment B1 wherein said curative part comprises greater than 4.1 wt % core/shell rubber nanoparticles.
B5. The two-part adhesive according to embodiment B1 wherein said curative part comprises greater than 5.1 wt % core/shell rubber nanoparticles.
B6. The two-part adhesive according to embodiment B1 wherein said curative part comprises greater than 6.1 wt % core/shell rubber nanoparticles.
B7. The two-part adhesive according to embodiment B1 wherein said curative part comprises greater than 6.7 wt % core/shell rubber nanoparticles.
B8. The two-part adhesive according to embodiment B1 wherein said curative part comprises greater than 7.1 wt % core/shell rubber nanoparticles.
B9. The two-part adhesive according to embodiment B1 wherein said curative part comprises greater than 8.1 wt % core/shell rubber nanoparticles.
B10. The two-part adhesive according to embodiment B1 wherein said curative part comprises greater than 9.1 wt % core/shell rubber nanoparticles.
B11. The two-part adhesive according to any of embodiments B1-B10 wherein said curative part comprises less than 49 wt % core/shell rubber nanoparticles.
B12. The two-part adhesive according to any of embodiments B1-B10 wherein said curative part comprises less than 39 wt % core/shell rubber nanoparticles.
B13. The two-part adhesive according to any of embodiments B1-B10 wherein said curative part comprises less than 29 wt % core/shell rubber nanoparticles.
B14. The two-part adhesive according to any of embodiments B1-B10 wherein said curative part comprises less than 19 wt % core/shell rubber nanoparticles.
B15. The two-part adhesive according to any of embodiments B1-B10 wherein said curative part comprises less than 14 wt % core/shell rubber nanoparticles.
B16. The two-part adhesive according to any of embodiments B1-B10 wherein said curative part comprises less than 9.7 wt % core/shell rubber nanoparticles.
B17. The two-part adhesive according to any of embodiments A1-A41 or B1-B16 wherein said epoxy part comprises greater than 9.1 wt % core/shell rubber nanoparticles.
B18. The two-part adhesive according to any of embodiments A1-A41 or B1-B16 wherein said epoxy part comprises greater than 11.1 wt % core/shell rubber nanoparticles.
B19. The two-part adhesive according to any of embodiments A1-A41 or B1-B16 wherein said epoxy part comprises greater than 12.1 wt % core/shell rubber nanoparticles.
B20. The two-part adhesive according to any of embodiments A1-A41 or B1-B16 wherein said epoxy part comprises greater than 12.4 wt % core/shell rubber nanoparticles.
B21. The two-part adhesive according to any of embodiments A1-A41 or B1-B16 wherein said epoxy part comprises greater than 13.1 wt % core/shell rubber nanoparticles.
B22. The two-part adhesive according to any of embodiments A1-A41 or B1-B16 wherein said epoxy part comprises greater than 14.1 wt % core/shell rubber nanoparticles.
B23. The two-part adhesive according to any of embodiments A1-A41 or B1-B16 wherein said epoxy part comprises greater than 15.1 wt % core/shell rubber nanoparticles.
B24. The two-part adhesive according to any of embodiments A1-A41 or B1-B16 wherein said epoxy part comprises greater than 16.1 wt % core/shell rubber nanoparticles.
B25. The two-part adhesive according to any of embodiments A1-A41 or B1-B16 wherein said epoxy part comprises greater than 16.3 wt % core/shell rubber nanoparticles.
B26. The two-part adhesive according to any of embodiments A1-A41 or B1-B16 wherein said epoxy part comprises greater than 16.6 wt % core/shell rubber nanoparticles.

B27. The two-part adhesive according to any of embodiments B1-B26 wherein said epoxy part comprises less than 23.8 wt % core/shell rubber nanoparticles.
B28. The two-part adhesive according to any of embodiments B1-B26 wherein said epoxy part comprises less than 22.9 wt % core/shell rubber nanoparticles.
B29. The two-part adhesive according to any of embodiments B1-B26 wherein said epoxy part comprises less than 21.9 wt % core/shell rubber nanoparticles.
B30. The two-part adhesive according to any of embodiments B1-B26 wherein said epoxy part comprises less than 20.9 wt % core/shell rubber nanoparticles.
B31. The two-part adhesive according to any of embodiments B1-B26 wherein said epoxy part comprises less than 19.9 wt % core/shell rubber nanoparticles.
B32. The two-part adhesive according to any of embodiments B1-B26 wherein said epoxy part comprises less than 19.5 wt % core/shell rubber nanoparticles.
B33. The two-part adhesive according to any of embodiments B1-B26 wherein said epoxy part comprises less than 18.9 wt % core/shell rubber nanoparticles.
B34. The two-part adhesive according to any of embodiments B1-B26 wherein said epoxy part comprises less than 17.9 wt % core/shell rubber nanoparticles.
B35. The two-part adhesive according to any of embodiments B1-B34 wherein, upon mixing of the curative par and the epoxy part to form a mixed adhesive, the mixed adhesive comprises greater than 11.1 wt % core/shell rubber nanoparticles.
B36. The two-part adhesive according to embodiment B35 wherein the mixed adhesive comprises greater than 12.1 wt % core/shell rubber nanoparticles.
B37. The two-part adhesive according to embodiment B35 wherein the mixed adhesive comprises greater than 13.1 wt % core/shell rubber nanoparticles.
B38. The two-part adhesive according to embodiment B35 wherein the mixed adhesive comprises greater than 14.1 wt % core/shell rubber nanoparticles.
B39. The two-part adhesive according to embodiment B35 wherein the mixed adhesive comprises greater than 15.1 wt % core/shell rubber nanoparticles.
B40. The two-part adhesive according to embodiment B35 wherein the mixed adhesive comprises greater than 16.1 wt % core/shell rubber nanoparticles.
B41. The two-part adhesive according to embodiment B35 wherein the mixed adhesive comprises greater than 16.6 wt % core/shell rubber nanoparticles.
B42. The two-part adhesive according to any of embodiments B1-B41 wherein, upon mixing of the curative par and the epoxy part to form a mixed adhesive, the mixed adhesive comprises less than 49.0 wt % core/shell rubber nanoparticles.
B43. The two-part adhesive according to embodiment B42 wherein the mixed adhesive comprises less than 39.0 wt % core/shell rubber nanoparticles.
B44. The two-part adhesive according to embodiment B42 wherein the mixed adhesive comprises less than 29.0 wt % core/shell rubber nanoparticles.
B45. The two-part adhesive according to embodiment B42 wherein the mixed adhesive comprises less than 19.0 wt % core/shell rubber nanoparticles.
B46. The two-part adhesive according to embodiment B42 wherein the mixed adhesive comprises less than 14.0 wt % core/shell rubber nanoparticles.
B47. The two-part adhesive according to any of embodiments B1-B46 wherein the epoxy part additionally comprises greater than 5.1 wt % solid epoxy resin.
B48. The two-part adhesive according to any of embodiments A1-A41 or B1-B46 wherein the epoxy part additionally comprises greater than 11.0 wt % solid epoxy resin.
B49. The two-part adhesive according to any of embodiments A1-A41 or B1-B46 wherein the epoxy part additionally comprises greater than 16.0 wt % solid epoxy resin.
B50. The two-part adhesive according to any of embodiments A1-A41 or B1-B46 wherein the epoxy part additionally comprises greater than 21.0 wt % solid epoxy resin.
B51. The two-part adhesive according to any of embodiments A1-A41 or B1-B46 wherein the epoxy part additionally comprises greater than 26.0 wt % solid epoxy resin.
B52. The two-part adhesive according to any of embodiments A1-A41 or B1-B46 wherein the epoxy part additionally comprises greater than 31.0 wt % solid epoxy resin.
B53. The two-part adhesive according to any of embodiments B1-B52 wherein the epoxy part comprises less than 49.0 wt % solid epoxy resin.
B54. The two-part adhesive according to any of embodiments B1-B52 wherein the epoxy part comprises less than 44.0 wt % solid epoxy resin.
B55. The two-part adhesive according to any of embodiments B1-B52 wherein the epoxy part comprises less than 39.0 wt % solid epoxy resin.
B56. The two-part adhesive according to any of embodiments B1-B52 wherein the epoxy part comprises less than 34.0 wt % solid epoxy resin.
B57. The two-part adhesive according to any of embodiments B47-B56 wherein the sum of the wt % solid epoxy resin and the wt % core/shell rubber nanoparticles in the epoxy part is greater than 11.0%.
B58. The two-part adhesive according to any of embodiments B47-B56 wherein the sum of the wt % solid epoxy resin and the wt % core/shell rubber nanoparticles in the epoxy part is greater than 21.0%.
B59. The two-part adhesive according to any of embodiments B47-B56 wherein the sum of the wt % solid epoxy resin and the wt % core/shell rubber nanoparticles in the epoxy part is greater than 31.0%.
B60. The two-part adhesive according to any of embodiments B47-B56 wherein the sum of the wt % solid epoxy resin and the wt % core/shell rubber nanoparticles in the epoxy part is greater than 41.0%.
B61. The two-part adhesive according to any of embodiments B47-B56 wherein the sum of the wt % solid epoxy resin and the wt % core/shell rubber nanoparticles in the epoxy part is greater than 46.0%.
B62. The two-part adhesive according to any of embodiments B47-B61 wherein the sum of the wt % solid epoxy resin and the wt % core/shell rubber nanoparticles in the epoxy part is less than 69.0%.
B63. The two-part adhesive according to any of embodiments B47-B61 wherein the sum of the wt % solid epoxy resin and the wt % core/shell rubber nanoparticles in the epoxy part is less than 59.0%.
B64. The two-part adhesive according to any of embodiments B47-B61 wherein the sum of the wt % solid epoxy resin and the wt % core/shell rubber nanoparticles in the epoxy part is less than 54.0%.
B65. The two-part adhesive according to any of embodiments B47-B61 wherein the sum of the wt % solid epoxy resin and the wt % core/shell rubber nanoparticles in the epoxy part is less than 49.7%.
B66. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is greater than 11.0%.

B67. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is greater than 16.0%.

B68. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is greater than 21.0%.

B69. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is greater than 26.0%.

B70. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is greater than 28.0%.

B71. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is less than 59.0%.

B72. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is less than 49.0%.

B73. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is less than 39.0%.

B74. The two-part adhesive according to any of embodiments B47-B65 wherein, upon mixing of the curative par and the epoxy part to form a mixed adhesive, the sum of the wt % solid epoxy resin and the wt % core/shell rubber nanoparticles in the mixed adhesive is less than 34.0%.

B75. The two-part adhesive according to any of embodiments B47-B74 wherein the solid epoxy resin is triglycidyl ether of trisphenol-methane.

B76. The two-part adhesive according to any of embodiments A1-A41 or B1-B75 wherein the curative part additionally comprises a reaction intermediate which is the reaction product of a suspension of core/shell rubber nanoparticles in a liquid epoxy resin and an excess of the one or more epoxy curatives.

B77. The two-part adhesive according to any of embodiments A1-A41 or B1-B76 wherein the curative part additionally comprises a poly-tetrahydrofuran amine toughener.

B78. The two-part adhesive according to embodiment B77 wherein the curative part additionally comprises more than 4.1 wt % poly-tetrahydrofuran amine toughener.

C1. An adhesive obtained by mixing the curative part with the epoxy part of any of the two-part adhesives according to any of embodiments A1-A41 or B1-B78.

C2. A cured material that results from mixing the curative part with the epoxy part of any of the two-part adhesives according to any of embodiments A1-A41 or B1-B78 and allowing cure.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., USA, or may be synthesized by conventional methods. Unless otherwise noted, the terms "solid" and "liquid" as applied to an epoxy resin refer to the phase of the uncured resin under standard temperature and pressure, such as the phase reported for that resin in the manufacturer's MSDS.

The following abbreviations are used to describe the examples:

° F.: degrees Fahrenheit
° C.: degrees Centigrade
cm: centimeters
cm/min: centimeters per minute
Kg: kilograms
KPa: kilopascals
Kpsi: kilo pounds per square inch
MPa: megapascals
mil: 10-3 inches
mm: millimeters
mm/min: millimeters per minute
μm: micrometers
N-25 mm: Newtons per 25 millimeter
psi: pounds per square inch
wt. %: weight percent
Materials Used.

ASP-200: hydrous aluminosilicates in very fine particles, obtained under the trade designation "ASP 200" from BASF Corporation, Ludwigshafen, Germany.

A-2167: high functionality polycycloaliphatic polyamine curing agent, obtained under the trade designation "ANCAMINE 2167" from Air Products and Chemicals, Inc., Allentown, Pa.

ATBN: An amine-terminated butadiene-acrylonitrile rubber, obtained under the trade designation "HYCAR 1300×16" from Lubrizol Advanced Materials, Inc., Brussels, Belgium.

CNTH: Calcium nitrate tetrahydrate, obtained from Aldrich Chemicals, Milwaukee, Wis.

DEN-431: A semi-solid epoxy novolac resin which is a reaction product of epichlorohydrin and phenol-formaldehyde novolac, obtained under the trade designation "D.E.N. 431" from Dow Chemical Company, Midland, Mich., USA, having an epoxy functionality of about 2.8.

E-232: A low-medium viscosity liquid epoxy resin consisting of a blend of a bisphenol A and a bisphenol F resin, obtained under the trade designation "EPIKOTE-232" from Momentive Performance Materials Holdings, LLC, Columbus Ohio, having an epoxy functionality of 2.

E-757: 1,4-Cyclohexandimethanoldiglycidylether, a cycloaliphatic difunctional reactive diluent having an epoxy functionality of 2, obtained under the trade designation "EPODIL 757" from Air Products and Chemicals, Inc., Allentown, Pa., USA.

E-828: liquid epoxy resin which is a diglycidyl ether of bisphenol A with an approximate epoxy equivalent weight of 187.5 grams/equivalent and an epoxy functionality of 2, obtained under the trade designation "EPON-828" from Hexion Specialty Chemicals, Houston, Tex.

FPL: An etch solution of sulfuric acid and sodium dichromate, obtained from Forest Products Laboratory, Madison, Wis.

K54: Tris-2,4,6-dimethylaminomethyl-phenol, obtained under the trade designation "ANCAMINE K-54" from Air Products and Chemicals, Inc.

OAKITE 165: A caustic wash solution, obtained under the trade designation "OAKITE 165" from Chemetall, GmbH, Frankfurt am Main, Germany.

MY-9655: Multifunctional tetraglycidyl methylenedianiline (TGMDA), obtained under the trade designation "ARALDITE MY-9655" from Huntsman Advanced Chemicals, Woodlands, Tex., having an epoxy functionality of 4.

MX-257 A liquid epoxy resin which is a diglycidyl ether of bisphenol-A epoxy resin having an epoxy functionality of 2 which additionally contains 37.5 wt. % butadiene-acrylic co-polymer core shell rubber, having an approximate epoxy equivalent weight of 294 grams/equivalent, obtained under the trade designation "KANE ACE MX-257", from Kaneka Texas Corporation, Pasadena, Tex., USA.

MX-416: A liquid epoxy resin which is a multifunctional tetraglycidyl methylenedianiline (TGMDA) having an epoxy functionality of 4, which additionally contains 25 wt. % core shell rubber (CSR) toughener, having an approximate epoxy equivalent weight of 148 grams/equivalent, obtained under the trade designation "KANE ACE MX-416" from Kaneka Corporation.

NBDA: Norbornane diamine, obtained under the trade designation "PRO-NBDA" from Mitsui Fine Chemicals, Inc., Tokyo, Japan.

T-742: A solid epoxy resin which is a tris-(hydroxyl phenyl)-methane-based epoxy resin having an epoxy functionality of 3, obtained under the trade designation "TACTIX 742" from Huntsman Corporation, Salt Lake City, Utah, USA, which is a waxy solid at room temperature. (Physical State reported as "Solid. [Flakes.]" in TACTIX® 742 RESIN MSDS, Huntsman Corporation, Salt Lake City, Utah)

THF 1700: Poly-tetrahydrofuran amine 1700, a diamine of approximately 1700 average molecular weight based on a poly(tetra methylene ether)glycol, obtained under the trade designation "POLYTHF AMINE 1700" from BASF Corporation.

TS-720: A treated fumed silica, available under the trade designation "CAB-O-SIL TS-720" from Cabot Corporation, Boston, Mass.

TTD: 4,7,10-Trioxa-1,13-tridecane-diamine, obtained from BASF, Ludwigshafen, Germany.

XC-72R: A carbon black obtained under the trade designation "VULCAN XC-72R" from Cabot Corporation.

Z-6040: 3-glycidoxypropyltrimethoxysilane, obtained from Dow Corning, Midland, Mich.

EXAMPLES

Part A-1 was prepared as follows. 9.42 grams TTD, 22.50 grams NBDA and 14.95 grams THF-1700 were dispersed in a plastic cup by means of a high speed mixer operating at 2,200 rpm and 21° C. for 2 minutes then 1-2 minutes at 80° C. The mixture was allowed to 21° C., after which 11.22 grams E-828 was dispersed by mixing at 2,200 rpm and 21° C. for approximately 3 minutes, then 5 minutes at 80° C., before cooling back to 21° C. 2.24 grams K-54 was then added and mixed for approximately 4 minutes, followed by 1.5 grams TS-720 and another 4 minutes of mixing. Finally, 3.74 grams ASP-200 was added and mixing continued until homogeneously dispersed.

Part A-2 was prepared as generally described in Part A-1, wherein the E-828 was substituted with MX-257, the ASP-200 was omitted and CNTH was added prior to the K-54, according to the composition listed in Table 1A.

Parts A-3 through A-9 and CA-1 (the Part A used in Comparative A) were prepared as generally described in Parts A-1 or A-2, according to the compositions listed in Table 1A. NBDA was omitted from CA-1.

Part B-1 was prepared as follows. 25.0 grams E-828, 40.0 grams MX-257 and 66.0 grams MX-416 were homogeneously dispersed at 21° C. by means of the high speed mixer for 5 minutes at 2,200 rpm.

Part B-2 was prepared as generally described in Part B-1, wherein MY-9655 was dispersed with the other resins, after which TS-720 and ASP-200 were also homogeneously dispersed in the mixture for 4 minutes at 2,200 rpm, according to the composition listed in Table 1B.

Parts B-3 through B-7 were prepared as generally described in Part B-2, according to the compositions listed in Table 1B.

Parts B-8, B-9 and CB-1 (the Part B used in Comparative A, not in itself "comparative"), were prepared as follows, according to the compositions listed in Table 1B. The resins MX-257, DEN-431, E-757, T-742, MY-9655, E-232 and E-828 were homogeneously dispersed at 21° C. by means of the high speed mixer for 5 minutes at 2,200 rpm. The TS-720, XC-72R and Z-6040 were then added and the mixture dispersed for an additional 5 minutes at 2,200 rpm.

TABLE 1A

| Component (epoxy functionality) | Part A Composition (grams) | | | | | | | | | |
|---|---|---|---|---|---|---|---|---|---|---|
| | A-1 | A-2 | A-3 | A-4 | A-5 | A-6 | A-7 | A-8 | A-9 | CA-1 |
| E-828 (2) | 11.22 | 0 | 0 | 0 | 7.50 | 0 | 7.50 | 0 | 0 | 0 |
| MX-257 (2) | 0 | 10.00 | 0 | 10.00 | 0 | 11.90 | 0 | 25.00 | 25.00 | 19.00 |
| NBDA | 22.5 | 23.79 | 31.00 | 23.79 | 22.50 | 22.50 | 23.50 | 27.00 | 30.00 | 0 |
| TTD | 9.42 | 9.95 | 16.00 | 9.95 | 9.45 | 9.45 | 8.40 | 20.00 | 15.00 | 57.00 |
| TS-720 | 1.50 | 1.65 | 1.50 | 1.65 | 1.50 | 2.50 | 1.00 | 0 | 0 | 0 |
| ASP-200 | 3.74 | 0 | 0 | 0 | 3.75 | 0 | 2.50 | 0 | 0 | 0 |
| THF-1700 | 14.95 | 15.86 | 16.00 | 15.86 | 0 | 15.00 | 15.00 | 25.00 | 25.00 | 25.00 |
| ATBN | 0 | 0 | 0 | 0 | 15.00 | 0 | 0 | 0 | 0 | 0 |
| K-54 | 2.24 | 2.25 | 1.00 | 0 | 2.25 | 2.25 | 1.50 | 2.00 | 3.10 | 1.00 |
| CNTH | 0 | 2.00 | 1.00 | 2.00 | 1.00 | 0.50 | 0 | 1.00 | 2.00 | 1.00 |

TABLE 1B

| Component (epoxy functionality) | Part B Composition (grams) | | | | | | | | | |
|---|---|---|---|---|---|---|---|---|---|---|
| | B-1 | B-2 | B-3 | B-4 | B-5 | B-6 | B-7 | B-8 | B-9 | CB-1 |
| E-828 (2) | 25.00 | 37.50 | 40.00 | 32.40 | 25.00 | 32.50 | 25.00 | 5.45 | 0 | 0 |
| MY-9655 (4) | 0 | 49.50 | 0 | 0 | 0 | 0 | 0 | 0 | 0 | 0 |
| MX-257 (2) | 40.00 | 29.00 | 40.00 | 29.50 | 40.00 | 32.50 | 40.00 | 35.00 | 42.00 | 45.00 |
| MX-416 (4) | 66.00 | 0 | 66.00 | 66.00 | 66.00 | 66.00 | 66.00 | 0 | 0 | 0 |
| TS-720 | 0 | 1.50 | 2.00 | 0.60 | 0 | 0 | 0 | 1.50 | 1.50 | 1.50 |
| ASP-200 | 0 | 11.50 | 0 | 1.50 | 0 | 0 | 0 | 0 | 0 | 0 |
| DEN-431 (~2.8) | 0 | 0 | 0 | 0 | 0 | 0 | 0 | 10.00 | 10.00 | 10.00 |
| E-757 (2) | 0 | 0 | 0 | 0 | 0 | 0 | 0 | 3.00 | 3.00 | 3.00 |
| XC-72R | 2.24 | 2.25 | 1.00 | 0 | 2.25 | 2.25 | 1.50 | 0.05 | 0.05 | 0.05 |
| T-742 (3) | 0 | 0 | 0 | 0 | 0 | 0 | 0 | 33.00 | 33.45 | 33.45 |
| Z-6040 | 0 | 0 | 0 | 0 | 0 | 0 | 0 | 2.00 | 2.00 | 2.00 |
| E-232 (2) | 0 | 0 | 0 | 0 | 0 | 0 | 0 | 8.00 | 8.00 | 8.00 |

Examples 1-9 and Comparative A

In a 2:1 weight ratio, A-1 was manually blended with B-1; A-2 with B-2, etc., through A-9 with B-9; corresponding to Examples 1-9, respectively. Comparative A corresponds to CA-1 manually blended with CB-1, also in a 2:1 weight ratio.

Test Methods

Grade 2024T3 bare aluminum panels were obtained from Erickson Metals of Minnesota, Inc., Coon Rapids, Minn. Prior to bonding with structural adhesive, the panels were subjected to one of the following surface preparation processes:

Panel Preparation

FPL Etched/Anodized/Sol-Gel Primed Panels

The bare aluminum panel was soaked in OAKITE 165 caustic wash solution for 10 minutes at 85° C. The panel was then immersed in tap water for 10 minutes at 21° C., followed by a continuous spray rinsing with tap water for approximately 3 more minutes. The panel was then immersed in an FPL etch solution for 10 minutes at 66° C., after which the panel was spray rinsed with water for approximately 3 minutes at 21° C., allowed to drip dry for another 10 minutes, then dried in an oven for 30 minutes at 54° C. The etched panel was then anodized in a bath of 85% percent phosphoric acid at 72° F. (22.2° C.) for approximately 25 minutes at a voltage of 15 volts and a maximum current of 100 amps, rinsed with water for approximately 3 minutes at 21° C., allowed to drip dry for another 10 minutes, then dried in an oven for 10 minutes at 66° C. Within 24 hours of being anodized, the aluminum panel was primed with a corrosion inhibiting primer, available under the trade designation "SCOTCH-WELD STRUCTURAL ADHESIVE PRIMER, EW-5000" from 3M Company, according to the manufacturer's instructions. The dried primer thickness was between 0.1-0.2 mils (2.5-5.1 µm). Approximately 4 grams of the Example were applied onto the end of a primed aluminum panel measuring 4 inches×7 inches×0.063 inches (10.16 cm×17.78 cm×0.16 cm). A second equally sized abraded and primed aluminum panel was then applied over the adhesive at an overlap of 0.5 inches (12.7 mm), and the assembly pressed between metal blocks at an approximate pressure of 2-5 psi (13.8-34.5 KPa). The panel assembly was cured at 70° F. (21.1° C.) for 16 hours, followed by a post cure at 250° F. (121.1° C.) for 30-60 minutes, then cut into 1-inch by 7-inch (2.54 cm by 17.78 cm) strips. Overlap shear strength was measured according to ASTM D-1002, by means of a model "SINTECH-30" tensile tester, obtained from MTS Corporation, Eden Prairie, Minn., at a grip separation rate of 0.05 inches/minute (1.3 mm/min). Six test panels were prepared and evaluated per each example.

Floating Roller Peel (FRP) Strength Test

Two primed and etched aluminum panels, one measuring 63 mils by 8-inches by 3-inches (1.60 mm by 20.32 cm by 7.62 cm), the other measuring 25 mils by 10-inches by 3-inches (0.635 mm by 25.4 cm by 7.62 cm), were bonded together as described in the Overlap Shear Test above. Test strips, 0.5 inches (12.7 mm) wide were cut from the bonded panel assembly and evaluated for floating roller peel strength of the thinner substrate, according to ASTM D-3167-76, using a tensile strength tester, model "SINTECH 20" from MTS Corporation, at a separation rate of 6 inches/minute (15.24 cm/min) and at 70° F. (21.1° C.). Results were normalized for 1-inch (2.54 cm) wide test strips. Five test panels were prepared and evaluated per each example.

Overlap Shear and Floating Roller Peel test results are listed in Table 2.

TABLE 2

| | OLS (psi/MPa) | | FRP (piw/N-25 mm) |
|---|---|---|---|
| Sample | 21° C. | 121° C. | 21° C. |
| Example 1 | 3960/27.3 | 2198/15.2 | 26.4/115.6 |
| Example 2 | 3365/23.2 | 1898/13.1 | 11.5/50.3 |
| Example 3 | 4267/29.4 | 2479/17.1 | 24.9/109.0 |
| Example 4 | 3740/25.8 | 1999/13.8 | 23.0/100.7 |
| Example 5 | 3710/25.6 | 710/4.9 | 32.3/141.4 |
| Example 6 | 4893/33.7 | 2683/18.5 | 14.6/63.9 |
| Example 7 | 4247/29.3 | 1824/12.6 | 15.2/66.5 |
| Example 8 | 3833/26.4 | 1467/10.1 | 8.7/38.1 |
| Example 9 | 4305/29.7 | 1626/11.2 | 22.4/98.1 |
| Comparative A | 4126/28.5 | *<200/1.4 | 51.8/226.8 |

*Specimen separated during testing.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A two-part adhesive comprising:
   A) a curative part comprising:
      i) one or more epoxy curatives, where the one or more epoxy curatives include norbornane diamine (NBDA) and the curative part comprises more than 11.0 wt % NBDA; and
      ii) a reaction intermediate which is the reaction product of a liquid epoxy resin having an epoxy functionality of 2 with an excess of the epoxy curatives; and
   B) an epoxy part comprising:
      iii) one or more multifunctional epoxy resins having an epoxy functionality of greater than 2.2.

2. The two-part adhesive according to claim 1, wherein the one or more multifunctional epoxy resins include a multifunctional epoxy resin with epoxy functionality of greater than 2.6.

3. The two-part adhesive according to claim 1, wherein the one or more multifunctional epoxy resins include a multifunctional epoxy resin with epoxy functionality of 3 or greater.

4. The two-part adhesive according to claim 1, wherein the one or more multifunctional epoxy resins include a multifunctional epoxy resin with epoxy functionality of 4 or greater.

5. The two-part adhesive according to claim 1, wherein the one or more epoxy curatives additionally include 4,7,10-Trioxa-1,13-tridecane-diamine (TDD).

6. The two-part adhesive according to claim 5 wherein the curative part comprises more than 6.0 wt % TDD.

7. The two-part adhesive according to claim 1, wherein the epoxy part comprises more than 21.0 wt % of multifunctional epoxy resins having an epoxy functionality of greater than 2.5.

8. The two-part adhesive according to claim 1, wherein the epoxy part comprises more than 21.0 wt % of multifunctional epoxy resins having an epoxy functionality of 4.

9. The two-part adhesive according to claim 1, wherein the one or more multifunctional epoxy resins include tetraglycidyl methylenedianiline (TGMDA).

10. The two-part adhesive according to claim 1, wherein the epoxy part comprises more than 21.0 wt % of tetraglycidyl methylenedianiline (TGMDA).

11. The two-part adhesive according to claim 1, wherein the epoxy part comprises more than 21.0 wt % of triglycidyl ether of trisphenol-methane.

12. The two-part adhesive according to claim 1, wherein the curative part additionally comprises core/shell rubber nanoparticles.

13. The two-part adhesive according to claim 1, wherein the curative part additionally comprises a reaction intermediate which is the reaction product of a suspension of core/shell rubber nanoparticles in a liquid epoxy resin and an excess of the one or more epoxy curatives.

14. The two-part adhesive according to claim 12, wherein said curative part comprises greater than 4.1 wt % core/shell rubber nanoparticles.

15. The two-part adhesive according to claim 1 wherein said epoxy part comprises greater than 9.1 wt % core/shell rubber nanoparticles.

16. The two-part adhesive according to claim 1 wherein the epoxy part additionally comprises greater than 11.0 wt % solid epoxy resin.

17. A cured material that results from mixing the curative part with the epoxy part of any of the two-part adhesives according to claim 1 and allowing cure.

18. A two-part adhesive comprising:
   A) a curative part comprising:
      i) one or more epoxy curatives, where the one or more epoxy curatives include norbornane diamine (NBDA) and additionally include 4,7,10-trioxa-1,13-tridecane-diamine (TDD); and
      ii) a reaction intermediate which is the reaction product of a liquid epoxy resin having an epoxy functionality of 2 with an excess of the epoxy curatives; and
   B) an epoxy part comprising:
      iii) one or more multifunctional epoxy resins having an epoxy functionality of greater than 2.2.

19. The two-part adhesive according to claim 18, wherein the curative part comprises more than 6.0 wt % TDD.

20. A two-part adhesive comprising:
   A) a curative part comprising:
      i) one or more epoxy curatives, where the one or more epoxy curatives include norbornane diamine (NBDA);
      ii) a reaction intermediate which is the reaction product of a liquid epoxy resin having an epoxy functionality of 2 with an excess of the epoxy curatives; and
      iii) core/shell rubber nanoparticles; and
   B) an epoxy part comprising:
      iii) one or more multifunctional epoxy resins having an epoxy functionality of greater than 2.2.

* * * * *